United States Patent
Lee (10) Patent No.: US 7,195,180 B2
(45) Date of Patent: Mar. 27, 2007

(54) METHODS AND SYSTEMS FOR SIMULATING MULTI-PHASE FLUID FLOWS, INCLUDING FIRE SUPPRESSANT FLOWS

(75) Inventor: Jaesoo Lee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 10/963,687

(22) Filed: Oct. 12, 2004

(65) Prior Publication Data

US 2006/0076430 A1 Apr. 13, 2006

(51) Int. Cl.
*A62C 5/02* (2006.01)
*A62C 2/00* (2006.01)
*B05B 17/04* (2006.01)

(52) U.S. Cl. .............................. 239/398; 239/8; 239/9; 239/10; 239/11; 169/43; 169/44

(58) Field of Classification Search ................ 239/398, 239/1, 8, 9, 10, 11, 67–70; 73/861.04; 169/43, 169/44
See application file for complete search history.

(56) References Cited

U.S. PATENT DOCUMENTS

| | | | | |
|---|---|---|---|---|
| 5,025,222 A | * | 6/1991 | Scott et al. | 324/639 |
| 5,551,305 A | * | 9/1996 | Farchi et al. | 73/861.04 |
| 5,741,980 A | * | 4/1998 | Hill et al. | 73/861.04 |
| 6,412,352 B1 | * | 7/2002 | Evans et al. | 73/861.04 |
| 6,434,495 B1 | * | 8/2002 | Kitamura et al. | 702/50 |

OTHER PUBLICATIONS

Elliott, D.G. et al., "Flow of Nitrogen-Pressurized Halon 1301 in Fire Extinguishing Systems," Nov. 1, 1984, 124 pgs, U.S. Army Tank-Automotive Command.

Gann, Richard G., "Completed Fire Suppression System Performance of Alternative Agents in Aircraft Engine and Dry Bay Laboratory, Simulations,", SP:890:vol. I, pp. I-Vii and 531-648, Nov. 1995, Building and Fire Research Laboratory, United States Department of Commerce.

* cited by examiner

*Primary Examiner*—Davis Hwu
(74) *Attorney, Agent, or Firm*—Perkins Coie LLP (57) ABSTRACT

Methods and systems for simulating multi-phase fluid flows, including fire suppressant flows, are disclosed. A method in accordance with one embodiment of the invention includes estimating flow properties of a multi-phase flow at a boundary of a volume and, based on the estimate of flow properties at the volume boundary, at least estimating a value for a quality of the multi-phase flow at the volume boundary. Based on the quality of the flow and the flow properties, the method can further include at least estimating a value for a liquid phase droplet velocity of a liquid phase portion of the flow, and based on the liquid phase droplet velocity, simulating characteristics of the flow into the volume. Accordingly, the method can be used to predict constituent concentrations in the volume, for example, concentrations of a fire suppressant in an aircraft engine compartment.

40 Claims, 7 Drawing Sheets

METHODS AND SYSTEMS FOR SIMULATING MULTI-PHASE FLUID FLOWS, INCLUDING FIRE SUPPRESSANT FLOWS

TECHNICAL FIELD

The present invention is directed generally toward methods and systems for simulating multi-phase fluid flows, including flows of fire suppressants in aircraft engine compartments.

BACKGROUND

Modern commercial transport aircraft are provided with a multitude of safety features, including fire suppression systems. Fire suppression systems are typically placed in high temperature areas of the aircraft, including the main engine compartments and the auxiliary power unit compartments. The fire suppression systems are then activated manually or automatically when a compartment fire is detected. Accordingly, the aircraft is typically outfitted with bottles or other reservoirs of fire suppressants, which are discharged in the event of a fire and then recharged after the aircraft lands.

Aircraft designers are tasked with designing fire suppression systems that are effective and yet lightweight, so as to provide in-flight safety without unnecessarily sacrificing payload weight and/or fuel efficiency. The weight of an aircraft fire suppression system depends to a large degree on the volume of fire suppressant that the system must carry. The effectiveness of the system depends on how quickly the system is able to establish a selected concentration of the fire suppressant throughout the compartment in which the suppressant is discharged. Designers typically estimate the amount of fire suppressant required for a particular aircraft installation, and then validate the estimate via experimental techniques. A typical experiment includes outfitting a representative compartment volume with concentration detectors, injecting a fire suppressant into the vented compartment volume, and experimentally determining whether the concentration of the fire suppressant in the compartment remains high enough for long enough in a large enough volume of the compartment to suppress a compartment fire. This estimation/validation process is repeated until a lightweight, effective design is produced.

Estimating the manner in which the fire suppressant is dispersed in the compartment is a difficult task because, among other factors, the suppressant is a mixture of multiple constituents in both liquid and gas phases, the compartment geometry is complex, the flow in the compartment is three dimensional, and the flow is unsteady (e.g., it varies with time). Accordingly, designers have increasingly relied on computer-based computational fluid dynamic (CFD) methods to more accurately simulate the flow of fluids in confined volumes. Commercially available CFD codes are capable of simulating the flow of multi-phase fire suppression mixtures through pipes and ducts (such codes include Hflow, available from Lassalle Technologies at www.lassalle.com), and simulating the dispersion of suppressants within an engine compartment (such codes include Fluent, available from Fluent Inc. of Lebanon, N.H.).

One drawback associated with the foregoing techniques is that it has been difficult to accurately simulate the flow of fire suppressant liquid droplets into an engine compartment volume. As a result, the accuracy with which current techniques simulate the time-varying concentration of the fire suppressant within an engine compartment volume may be significantly limited. Accordingly, the designer must often rely on repeated and expensive experiments before validating the effectiveness of a fire suppression system design.

SUMMARY

The present invention is directed generally to methods and systems for simulating multi-phase fluid flows, including the flows of fire suppressants in confined volumes, such as aircraft engine compartments. A method for predicting characteristics of a multi-phase flow into a volume in accordance with one aspect of the invention includes estimating flow properties of the two-phase flow at a volume boundary and, based on the estimate of flow properties, at least estimating a value for a quality of the flow (e.g., the fraction of the flow that is in a vapor state) at the volume boundary. Based on the quality of the flow and the flow properties, the method can further include at least estimating a value for a liquid phase droplet velocity of a liquid phase of the flow. The method can further include simulating characteristics of the flow into the volume based on the liquid phase droplet velocity. The simulated characteristics can include concentration gradients of the constituents of the flow.

Methods in accordance with particular aspects of the invention can include simulating the flow of a fire suppressant from a storage vessel through a conduit to a nozzle using an unsteady, two-phase, multi-component, one-dimensional numerical prediction technique to obtain an estimate of flow properties, including the gas phase flow velocity, at an exit plane of the nozzle. The method can further include estimating the quality of the two-phase flow at the nozzle exit plane, based on the estimated flow properties. Based on the estimated quality, the gas phase flow velocity, and a correction factor, the method can further include determining an estimate of liquid phase droplet velocities. Based on the estimate of liquid phase droplet velocities, the method can include simulating the flow of the fire suppressant into a volume using an unsteady, two-phase, multi-component, three-dimensional numerical prediction technique.

DETAILED DESCRIPTION

The present invention is directed generally toward methods and systems for predicting multi-phase fluid flows. In particular embodiments, the methods can be applied to predicting the flow of one or more fire suppressants in a confined volume, for example, an engine compartment. Several embodiments of the methods are described in the context of such systems. A person skilled in the relevant art will understand, however, that the invention may have additional embodiments, and that the invention may be practiced without several of the details of the embodiments described below with reference to FIGS. 1–7.

Figure 1:
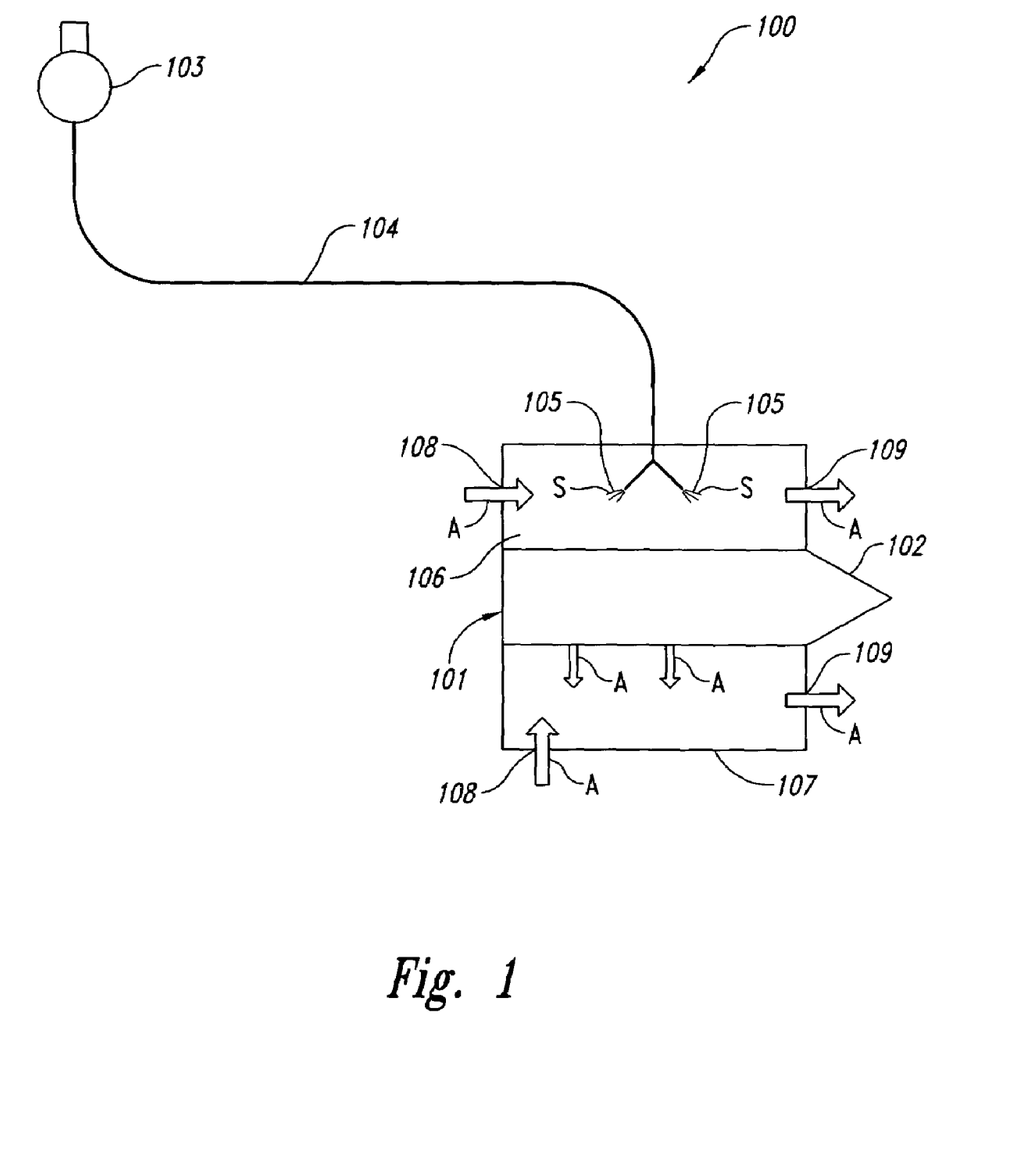
FIG. 1 is a partially schematic illustration of a fire suppression system and associated engine compartment that can be analyzed with a method in accordance with an embodiment of the invention.

FIG. 1 illustrates a system 100 (e.g., an aircraft system) that includes a fire suppression capability. The system 100 can accordingly include a reservoir 103 in which a fire suppressant is stored, a conduit 104 through which the fire suppressant passes, and one or more nozzles 105 (two are shown in FIG. 1) through which the fire suppressant is dispersed. The fire suppressant (represented by letter S in FIG. 1) exits the nozzles 105 into an interior volume 106 of a compartment 107.

The compartment 107 can house an engine 101 (e.g., an aircraft turbofan engine) and/or other components. When the compartment 107 houses a turbofan engine 101, the engine can include a core 102, and the nozzles 105 can be positioned to direct the fire suppressant S into a region external to the core 102 and within the compartment 107. The compartment 107 can be vented and can accordingly include air flow entrances 108 and air flow exits 109. Air can pass into, through, and out of the compartment 107 via the entrances 108 and exits 109, as indicated by arrows A. Bleed air can also be extracted from the engine core 102 and directed into the compartment 107.

In operation, the reservoir 103 is charged with a fire suppressant S (e.g., a mixture of nitrogen or another inert gas, and Halon 1301, HFC-125, and/or $CF_3I$). If a fire or other over-temperature event is detected in the compartment 107, the reservoir 103 discharges the fire suppressant S through the nozzles 105 for a selected period of time, or until the reservoir 103 is empty. To be effective, the system 100 must maintain a concentration of the fire suppressant S at one or more selected points within the compartment 107, for a selected period of time. Representative requirements for fire suppression systems are promulgated by the FAA. Accordingly, fire suppression system designers can use a combination of predictive techniques and experimental techniques to determine whether selected designs are effective, and to alter the designs based on the results obtained from the predictive and experimental techniques. Predictive techniques in accordance with embodiments of the invention are described below with reference to FIGS. 2–7.

Figure 2:
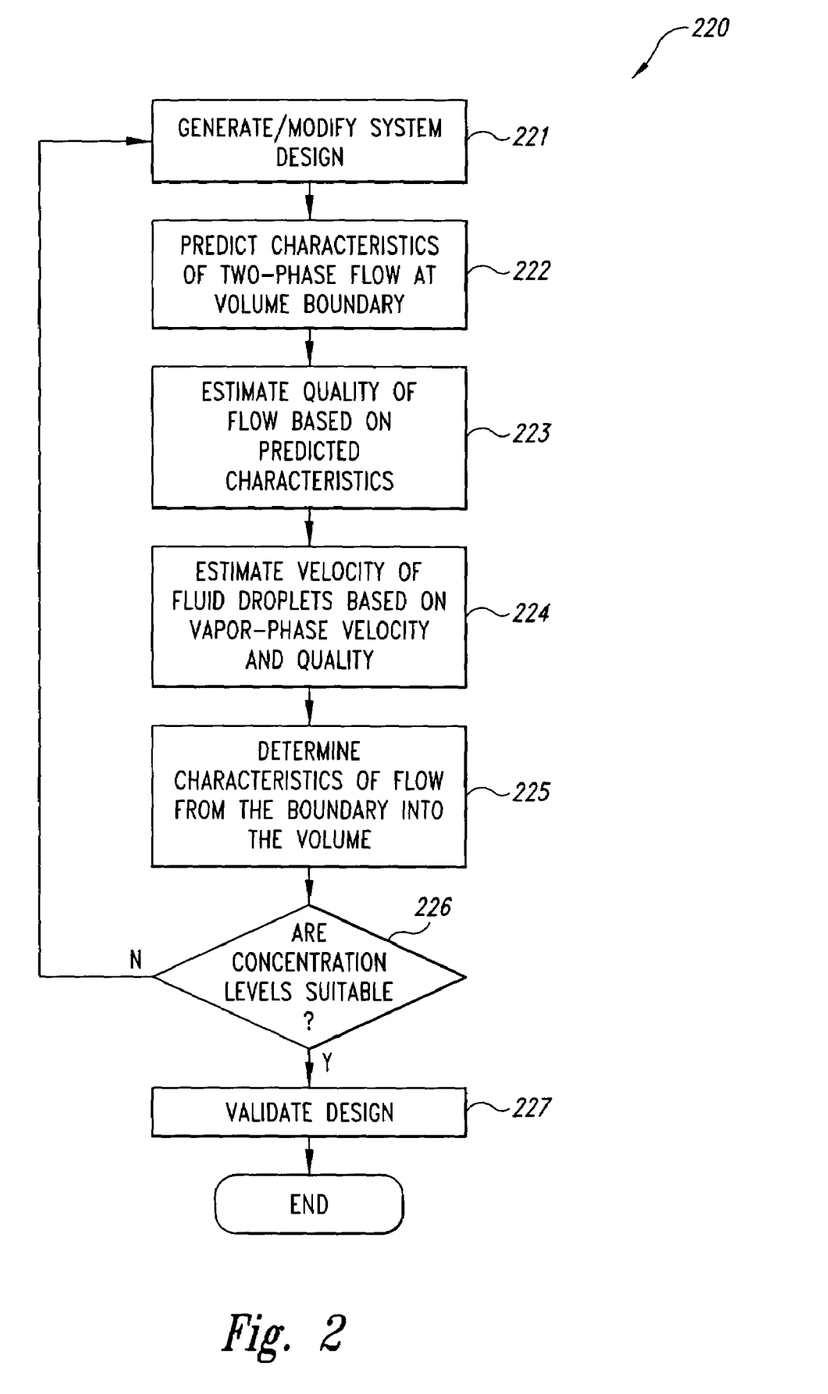
FIG. 2 is a flow diagram illustrating a process for predicting the characteristics of a flow of fire suppressant into a volume, in accordance with an embodiment of the invention.

FIG. 2 illustrates a method 220 for designing systems, e.g., fire suppression systems, in accordance with an embodiment of the invention. In process portion 221, the process includes generating and/or modifying a system design. The system design can include components generally similar to those described above with reference to FIG. 1, for example, a fire suppressant reservoir, conduit, nozzle (s), and compartment into which the reservoir discharges the fire suppressant flow. In process portion 222, the process 220 includes predicting characteristics of a two-phase flow at a boundary of the volume. For example, the method can include predicting the characteristics of a liquid/vapor fire suppressant flow at the exits of the nozzles 105 shown in FIG. 1. Using the predicted characteristics identified in process portion 222, the process can further include estimating a quality of the flow (process portion 223). As used herein, the quality of the flow refers to the volumetric fraction of the flow that is in a gas or vapor phase. In process portion 224, the velocity of fluid droplets crossing the volume boundary are estimated based on the velocity of the vapor phase flow (one of the characteristics determined in process portion 222) and the quality (determined in process portion 223). In process portion 225, the characteristics of the flow from the boundary into the volume are then determined. These characteristics can include flow velocities (of gas and liquid phase portions of the flow), temperatures, pressures and concentrations.

In process portion 226, the process 220 includes determining whether the concentration levels in the volume are suitable. For example, process portion 226 can include determining whether concentration levels of a fire suppressant at one or more points within the volume remain high enough for a long enough period of time to quench a fire in the compartment. If the concentration levels are suitable, the design can be validated in process portion 227, for example, via experimental techniques. If the concentration levels are not suitable, the process 200 can return to process portion 221 and can include modifying the system design, such as the placement of injection nozzles so as to produce suitable concentration levels. Process portions 221–226 can be repeated until suitable design, including nozzle placement is achieved. Further details of aspects of the foregoing steps are described below with reference to FIG. 3.

Figure 3:
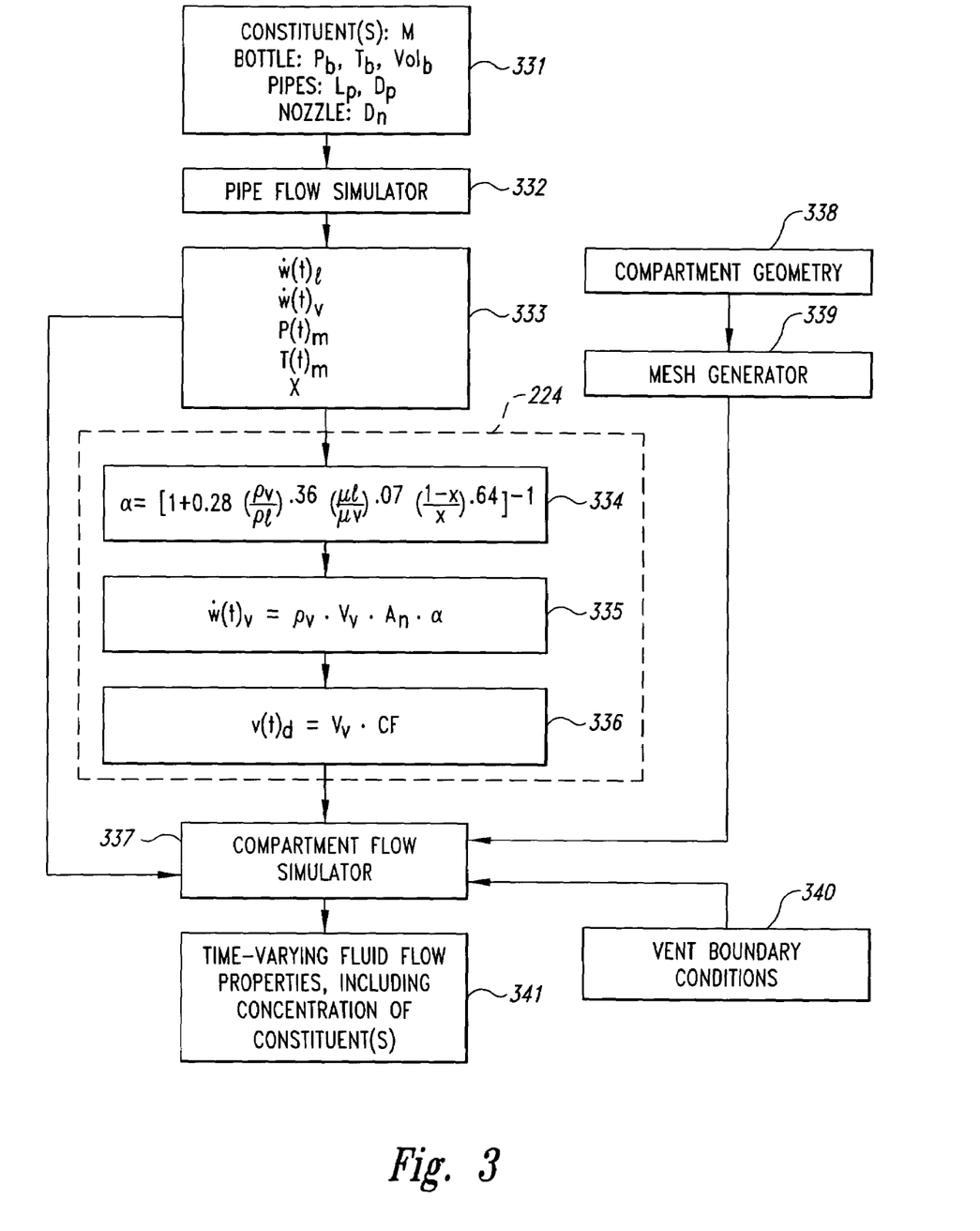
FIG. 3 is a block diagram illustrating representative inputs, outputs, and calculation techniques for predicting the concentration of constituents in a volume, in accordance with an embodiment of the invention.

FIG. 3 is a flow diagram illustrating calculation modules and formulae corresponding to aspects of the process 220 (described above with reference to FIG. 2), along with associated inputs and outputs. Block 332 identifies a pipe flow simulator that calculates flow through a pipe system, e.g., from the reservoir 103 through the conduit 104, and to the nozzles 105 shown in FIG. 1. In one aspect of this embodiment, the pipe flow simulator can include an unsteady, two-phase, two-component, one-dimensional numerical prediction tool, for example, the Hflow code, available from Lassalle Technologies at www.lassalle.com. In other embodiments, the pipe flow simulator 332 can include other suitable codes or code modules. In a particular embodiment, the pipe flow simulator 332 receives inputs identified in block 331 and produces outputs identified in block 333. The inputs can include the mass (M) of the flow constituent or constituents (e.g., a combination of nitrogen and Halon 1301, HFC-125 and/or $CF_3I$), the pressure ($P_b$), temperature ($T_b$) and volume ($V_b$) of the reservoir or bottle in which the constituents are housed, the length ($L_p$) and diameter ($D_p$) of the pipe or pipes through which the constituents pass, and the diameter or diameters ($D_n$) of the nozzles through which the constituents pass into the compartment volume. The outputs can include the time-varying mass flow rate of the liquid portion of the flow ($\dot{w}(t)_l$), the time-varying mass flow rate of the vapor portion of the flow ($\dot{w}(t)_v$), the time-varying pressure of the mixture ($P(t)_m$), the time-varying temperature of the mixture ($T(t)_m$), and the mass fraction of the vapor portion of the fire suppressant to the liquid portion of the fire suppressant (X).

Block 224 corresponds to the process portion described above with reference to FIG. 2 (estimating the velocity of the fluid droplets based on vapor-phase velocity and quality of the flow at the nozzle exit). Equations 334, 335, and 336 illustrate one method for determining the velocity of the fluid droplets, identified as $v(t)_d$.

Equation 334 can be used to calculate the quality of the flow ($\alpha$), using a known two-phase flow correlation by Lockhart and Martinelli. The quality is calculated based on the mass fraction of the vapor (X) and the densities and viscosities of the vapor and liquid phase portions of the flow (represented by $\rho_v$, $\rho_l$, $\mu_v$, and $\mu_l$). The densities and viscosities of the liquid and vapor portions of the flow can be calculated from the pressures and temperatures identified in block 333, using known gas and liquid relationships.

Equation 335 identifies the time-varying mass flow rate of the vapor portion of the flow ($\dot{w}(t)_v$) as being equal to the product of the vapor density ($\rho_v$), the vapor velocity ($v_v$), the cross-sectional area of the nozzle ($A_n$), and the quality of the flow ($\alpha$). The mass flow rate of the vapor, the density of the vapor, and the quality were determined in block 333 and 334. The cross-sectional area of the nozzle is obtained from the dimension of the designed nozzle, and accordingly, equation 335 can be solved to determine the velocity of the vapor ($v_v$).

Once the vapor velocity is determined, the velocity of the droplets of liquid (which forms the liquid portion of the flow) can be determined using equation 336. Equation 336 identifies the time-varying velocity of individual droplets of the liquid portion of the flow as being equal to the product of the velocity of the vapor portion of the flow and a correction factor, CF. In a particular aspect of this embodiment, the correction factor CF can have a value of between 0.8 and 1.0. The particular value selected for CF can depend on the expected size of the droplets passing out of the nozzles. Typically, the smaller the droplets, the higher the value of CF. The size of the droplets can be estimated using empirical relationships. In most cases, the size of the droplets vary, e.g., in a Gaussian manner about a mean droplet size. Accordingly, the correction factor CF can be selected based on the mean droplet size. If the distribution of droplet sizes varies in some other manner, the correction factor CF can be updated accordingly.

Block 337 represents a compartment flow simulator that receives the inputs from the pipe flow simulator 332 and the velocity droplet calculation described above, and outputs time-varying fluid flow properties (block 341), including the concentration of constituents in the flow, for example, fire suppressant agents. In one aspect of this embodiment, the compartment flow simulator includes an unsteady, two-phase multi-component, three-dimensional numerical predictor. One suitable example of such a predictor is the Fluent flow code available from Fluent, Inc. of Lebanon, N.H. In other embodiments, other suitable flow codes can be used in this context.

The compartment flow simulator 337 can also include as an input the geometry of the compartment and, if applicable, the flow of gases other than the fire suppressant (e.g., the vent air described above with reference to FIG. 1) within the compartment. Accordingly, a mesh generator 339 can be used to generate a mesh based on a numerical definition of the compartment geometry (block 338). The mesh can then be input into the compartment flow simulator 337, along with the boundary conditions described above. The compartment flow simulator 337 can also receive vent flow boundary conditions 340, e.g., the pressures, temperatures and/or mass flow rates of air moving into and out of the compartment. Based on the compartment geometry, the time-varying characteristics of the fire suppressant introduced into the compartment, and the characteristics of other flows, e.g., the vent flows, the compartment flow simulator 337 calculates the time-varying fluid flow properties within the compartment. In some embodiments, the concentration of the fire suppressant constituents can be calculated directly by the compartment flow simulator 337, and in other embodiments, the concentration values can be calculated by a post-processor routine, based on flow properties output by the compartment flow simulator 337.

Figure 4:
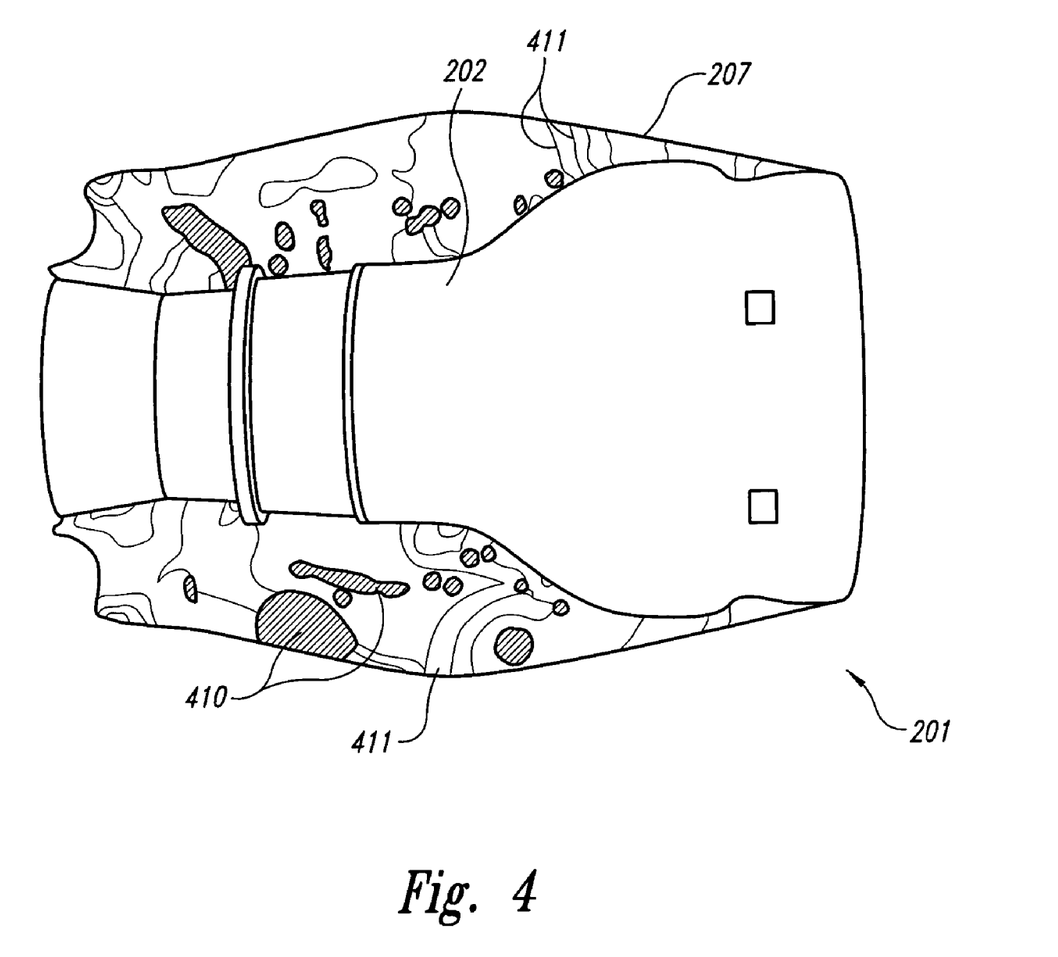
FIG. 4 is a horizontal view through a turbofan engine compartment, illustrating representative suppressant concentration gradient lines predicted using methods in accordance with an embodiment of the invention.

FIG. 4 is a partially schematic, top-down illustration of the engine 201, including the engine core 202 positioned within the compartment boundary 207. Structures 410 positioned outside the engine core 210, but within the compartment boundary 207 are identified with cross-hatching in FIG. 4. FIG. 4 also illustrates concentration gradient lines 411, which indicate predicted concentration levels of the fire suppressant within the compartment boundary 207. The concentration gradients are typically presented in different colors, for ease of viewing, but are represented by simple lines 411 in FIG. 4 for purposes of illustration. Based on a comparison of the concentration gradient lines 411 with required concentration levels, the designer can determine whether the flow of the fire suppressant within the compartment boundary is suitable. If so, the designer can optionally validate the design (e.g., with an experimental technique). If not, the designer can update the design (e.g., by updating characteristics of the reservoir constituents, nozzle placement, and/or compartment geometry) and rerun the calculation described above.

One aspect of an embodiment of the methods described above with reference to FIGS. 1–4 is that they can include a representation of the velocity of fire suppressant droplets entering the compartment volume, based on predictions for two-phase flows at the nozzle exit. In a particular aspect of this embodiment, the droplet velocities can be based on a determination of the quality of the flow, the velocity of the vapor phase of the flow, and a correction factor. An advantage of this arrangement is that it can more accurately simulate the nature of the flow (and in particular, the velocity of droplets in the flow) as the flow enters the compartment. This in turn can produce a more accurate simulation of the heat transfer relationships between the droplets and the surrounding flow, and the phase change (e.g., evaporation) that the droplets undergo. Because this technique is expected to be more accurate than current techniques, it can reduce the number of design iterations required to achieve a satisfactory design, and can also reduce the reliance on experimental techniques for producing a suitable design.

Another advantage of embodiments of the methods described above with reference to FIGS. 1–4 is that many, if not all, of the processes can be automated. For example, the calculations described with reference to process portion 224 in FIGS. 2 and 3 can be performed automatically, based on the outputs 333 from the pipe flow simulator 332. An advantage of this arrangement is that a user need not perform these calculations manually, which can take a significant amount of time, particularly when the calculations must be performed for each of a multitude of time intervals. This is typically the case when simulating the time-varying flow of a selected mass of a fire suppressant into a compartment volume.

Figure 5:
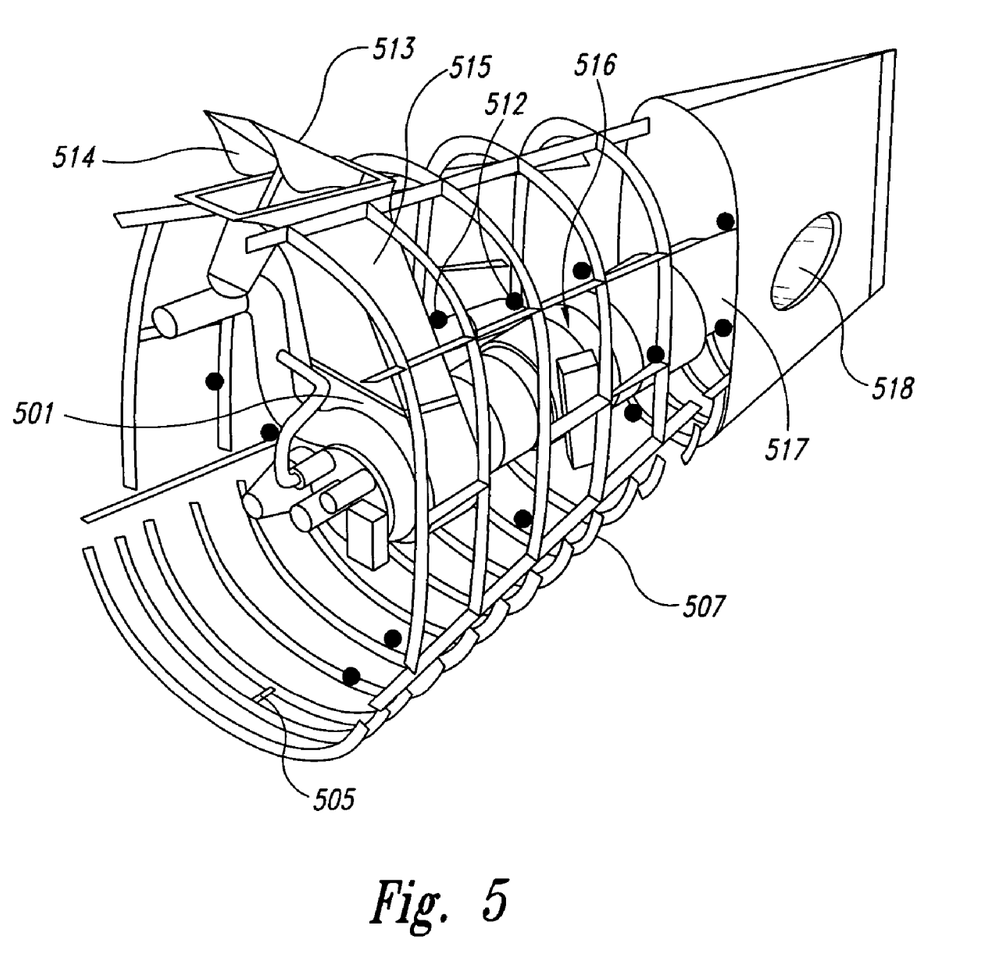
FIG. 5 is a partially schematic, isometric illustration of an aircraft auxiliary power unit and fire suppressant injection nozzle positioned in a compartment.

In other embodiments, the foregoing methods can be applied to geometries other than the geometry described above with reference to FIG. 4. For example, FIG. 5 illustrates an auxiliary power unit (APU) 501 positioned in an auxiliary unit compartment 507. The APU 501 can include an inlet duct 515 that receives air for the APU engine via an inlet aperture 514. A deployable inlet door 513 controls whether the inlet aperture 514 is open or closed. An exhaust duct 517 having an exhaust aperture 518 conducts combustion products away from the APU 501. Some of the flow entering the inlet duct 515 is vented directly into the APU compartment 507 to provide cooling flow to an oil cooler 516. An injection nozzle 505 is positioned within the APU compartment 507 to disperse the fire suppressant therein. Probes 512 identify locations within the compartment that are typically used in an experimental setting to determine whether the fire suppressant concentrations are adequate to provide suitable fire protection.

Figure 6A:
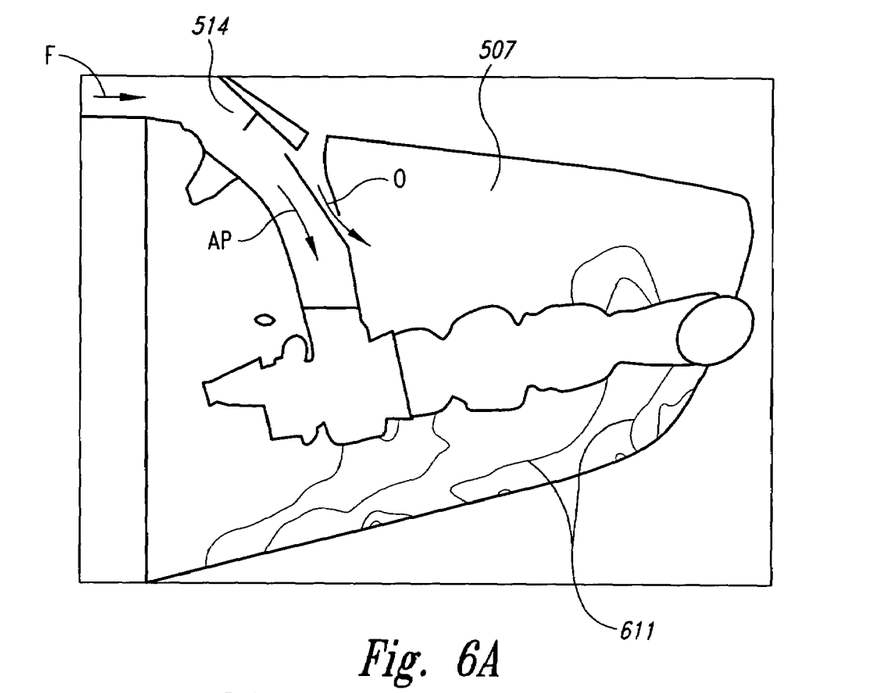
FIGS. 6A–6B illustrate representative fire suppressant concentration gradients in an auxiliary power unit compartment, predicted using methods in accordance with an embodiment of the invention.
Figure 6B:
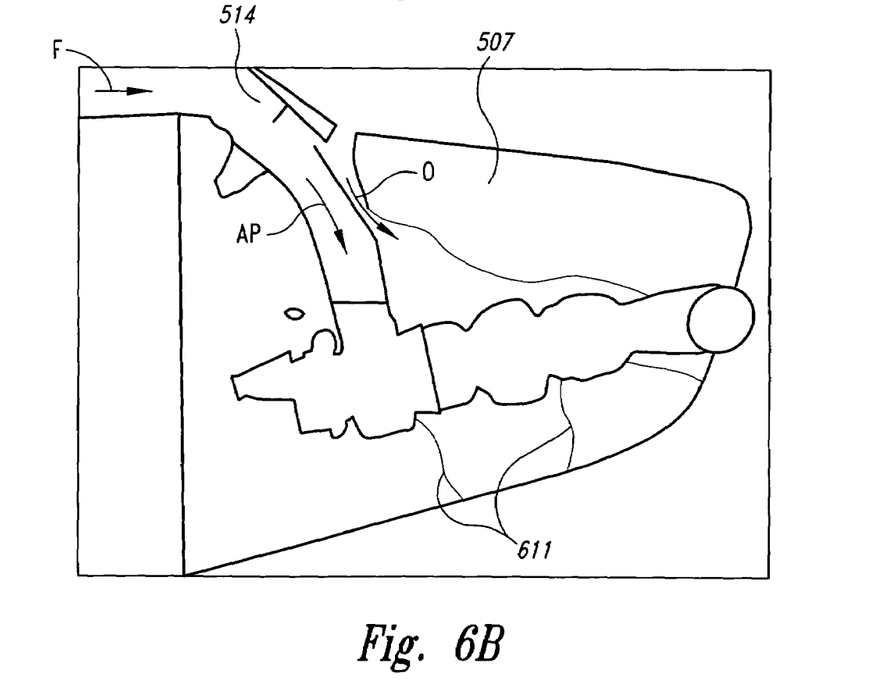

FIGS. 6A and 6B illustrate vertical cross-sectional sections taken through the geometry shown in FIG. 5, along with concentration gradient lines 611. FIG. 6A illustrates the concentration gradients after 0.3 seconds have elapsed from an initiation of the fire suppressant flow into the compartment, and FIG. 6B illustrates concentration gradients after 10 seconds have elapsed. Both figures illustrate a free stream flow F entering the APU inlet aperture 514, an APU flow AP entering the APU engine, and an oil cooling flow O passing out of the inlet duct 515 and into the APU compartment 507. Concentration gradient lines 611 indicate the concentration levels of the fire suppressant in the compartment. Based on the results illustrated by the concentration gradient lines 611, the designer can update the design or proceed with further validation.

Figure 7:
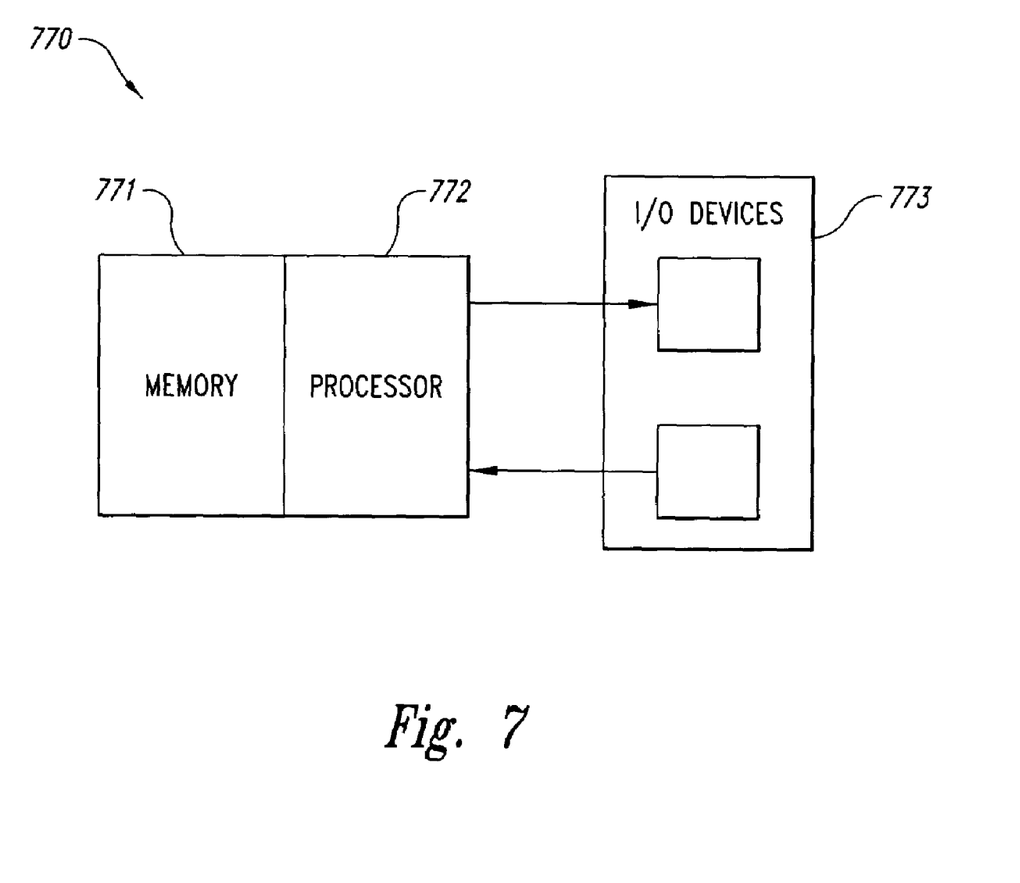
FIG. 7 illustrates a system that includes computer-readable media for performing methods in accordance with embodiments of the invention.

As described above, most if not all of the process portions described above can be implemented in an automated fashion on a computer. FIG. 7 illustrates a computer system 770 having a memory 771, a processor 772, and input/output devices 773. The foregoing automated techniques can be encoded in computer-readable media accessible via the input/output devices 773, resident in the memory 771, and/or executed by the processor 772. The input/output devices 773 can also be used to import boundary condition information and export flow simulation results. Accordingly, many embodiments of the invention may take the form of computer-executable instructions, such as routines executed by a programmable computer. For example, flow properties at a boundary of a compartment volume can be determined by a computer-based flow calculator or estimator, flow quality can be determined by a computer-based quality calculator or estimator, and droplet velocities can be determined by a computer-based velocity calculator or estimator. Those skilled in the relevant art will appreciate that the invention can be practiced on other computer system configurations as well. The invention can be embodied in a special-purpose computer or data processor that is specifically programmed, configured or constructed to perform one or more of the computer-executable instructions described above. Accordingly, the term "computer" as generally used herein includes any processor and can include internet appliances, hand-held devices (including Palm-top computers, cellular or mobile phones, multiprocessor systems, processor-based or programmable consumer electronics, minicomputers and the like).

The invention can also be practiced in distributed computing environments, in which tasks or modules are performed by remote processing devices that are linked with a communications network. In a distributed computing environment, program modules or subroutines may be located in both local and remote memory storage devices. Aspects of the invention described above may be stored or distributed on computer-readable media, including magnetic or optically readable computer disks (e.g., removable disks), as well as distributed electronically over networks. Data structures and transmissions of data particular to aspects of the invention are also encompassed within the scope of the invention.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

I claim:

1. A method for predicting characteristics of two-phase flow into a volume, comprising:
    estimating flow properties of a multi-phase flow at a boundary of a volume;
    based on the estimate of flow properties at the volume boundary, at least estimating a value for a quality of the multi-phase flow at the volume boundary;
    based on the quality of the flow and the flow properties, at least estimating a value for a liquid phase droplet velocity of a liquid phase of the flow; and
    based on the liquid phase droplet velocity, simulating characteristics of the flow into the volume.

2. The method of claim 1 wherein at least estimating a value for a liquid phase droplet velocity includes automatically calculating a multitude of liquid phase droplet velocities at a corresponding multitude of time intervals.

3. The method of claim 1 wherein at least one of estimating flow properties, estimating a value for a quality, estimating a value for a liquid phase droplet velocity, and simulating characteristics of the flow is implemented on a computer.

4. The method of claim 1 wherein estimating flow properties includes estimating flow properties as a function of time, and wherein simulating characteristics of the flow includes simulating characteristics of the flow as a function of time.

5. The method of claim 1 wherein estimating flow properties includes estimating liquid density, vapor density, liquid viscosity, vapor viscosity and a mass fraction of the flow that is in a vapor phase.

6. The method of claim 1 wherein at least estimating a value for a quality of the flow includes estimating a volumetric fraction of the flow that is in vapor phase.

7. The method of claim 1 wherein at least estimating a value for a liquid phase droplet velocity includes at least estimating a velocity of vapor phase flow at the boundary, and multiplying the velocity of the vapor phase flow by a factor that is less than one to obtain the liquid phase droplet velocity.

8. The method of claim 1 wherein at least estimating a value for a liquid phase droplet velocity includes at least estimating a velocity of vapor phase flow at the boundary, and multiplying the velocity of the vapor phase flow by a factor that is less than one and greater than or equal to about 0.8 to obtain the liquid phase droplet velocity.

9. The method of claim 1, further comprising estimating a size for the liquid phase droplets, and wherein at least estimating a value for a liquid phase droplet velocity includes at least estimating a velocity of vapor phase flow at the boundary, and multiplying the velocity of the vapor phase flow by a factor that is less than one and is selected based on the size of the liquid phase droplets to obtain the liquid phase droplet velocity.

10. The method of claim 1 wherein estimating flow properties of a multi-phase flow includes using an unsteady, two-phase, multi-component, one-dimensional numerical prediction technique.

11. The method of claim 1 wherein simulating characteristics of the flow into the volume includes using an unsteady, two-phase, multi-component, three-dimensional numerical prediction technique.

12. The method of claim 1 wherein estimating flow properties of a multi-phase flow at a boundary of a volume includes estimating flow properties of a fire suppressant at a nozzle exit plane.

13. The method of claim 1 wherein simulating characteristics of the flow into the volume includes determining a concentration of at least one constituent of the flow within the volume.

14. The method of claim 1 wherein estimating flow properties of a multi-phase flow at a boundary of a volume includes estimating flow properties of a plurality of two-phase flows at a corresponding plurality of boundaries.

15. The method of claim 1 wherein calculating a quality includes calculating a quality according to the following equation:

$$\alpha = \left[1 + 0.28\left(\frac{\rho_v}{\rho_l}\right)^{0.36}\left(\frac{\mu_l}{\mu_v}\right)^{0.07}\left(\frac{1-x}{x}\right)^{0.64}\right]^{-1}$$

where $\rho$ denotes density, $\mu$ denotes viscosity, subscript l denotes liquid, subscript v denotes vapor, and $\alpha$ denotes quality.

16. The method of claim 1 wherein estimating flow properties of a multi-phase flow includes estimating flow properties of a flow of fire suppressant.

17. The method of claim 1 wherein estimating flow properties includes estimating flow properties as a function of time, and wherein estimating a liquid phase droplet velocity includes estimating a liquid phase droplet velocity as a function of time, and further wherein simulating characteristics of the flow into the volume includes determining a concentration of at least one constituent of the flow as a function of time.

18. The method of claim 1 wherein simulating characteristics of the flow into the volume includes simulating characteristics of a flow of fire suppressant into at least one of an auxiliary power unit compartment and a turbofan engine casing.

19. The method of claim 1, further comprising experimentally validating a design of the volume geometry and a concentration of a constituent of the flow within the geometry.

20. The method of claim 1 wherein simulating characteristics of the flow into the volume includes determining a concentration of at least one constituent of the flow within the volume, and wherein the method further comprises:
comparing the concentration with a selected concentration value; and
if the concentration differs from the selected concentration value by more than a threshold amount, changing a geometry of the volume, or changing a manner in which the flow is delivered to the volume boundary, or both.

21. A fire suppression system designed using the method of claim 1.

22. A computer-implemented method for predicting the flow of a fire suppressant into a volume, comprising:
simulating a flow of a fire suppressant from a storage vessel through a conduit to a nozzle using an unsteady, two-phase, multi-component, one-dimensional numerical prediction technique to obtain an estimate of flow properties at an exit plane of the nozzle;
based on the estimate of flow properties, including a vapor phase velocity, at the nozzle exit plane, estimating a quality of the two-phase flow at the nozzle exit plane;
based on the estimated quality and the vapor phase velocity, estimating liquid phase droplet velocities;
based on the estimate of the liquid phase droplet velocities, simulating a flow of the fire suppressant into a volume using an unsteady, two-phase, multi-component, three-dimensional numerical prediction technique; and
estimating a concentration of the fire suppressant within the volume.

23. The method of claim 22 wherein estimating a concentration includes estimating a concentration at a plurality of locations within the volume.

24. The method of claim 22 wherein obtaining an estimate of flow properties at an exit plane of the nozzle includes obtaining an estimate of flow properties at a plurality of exit planes of a corresponding plurality of nozzles.

25. A computer-implemented method for predicting the flow of a fire suppressant into an aircraft volume, comprising:
simulating a flow of a fire suppressant from a storage vessel through a conduit to at least one nozzle using an unsteady, two-phase, multi-component, one-dimensional numerical prediction technique to obtain an estimate of vapor density, liquid density, vapor viscosity, liquid viscosity, and vapor mass fraction at an exit plane of the at least one nozzle;
based on the estimate of flow properties at the at least one nozzle exit plane, determining a quality of the two-phase flow at the nozzle exit plane using the following relationship:

$$\alpha = \left[1 + 0.28\left(\frac{\rho_v}{\rho_l}\right)^{0.36}\left(\frac{\mu_l}{\mu_v}\right)^{0.07}\left(\frac{1-x}{x}\right)^{0.64}\right]^{-1}$$

where $\rho$ denotes density, $\mu$ denotes viscosity, subscript l denotes liquid, subscript v denotes vapor, and $\alpha$ denotes quality;
based on the quality and the estimate of the flow properties, estimating the velocity of liquid phase droplets of the flow by determining a velocity of the vapor phase of the flow, and multiplying the result by a factor having a value in the range of from about 0.8 to less than 1.0;
based on the estimate of the liquid phase droplet velocities, simulating a flow of the fire suppressant into an aircraft compartment using an unsteady, two-phase, multi-component, three-dimensional numerical prediction technique; and
estimating a concentration of the fire suppressant in the aircraft compartment as a function of time.

26. The method of claim 25 wherein simulating a flow of the fire suppressant into an aircraft compartment includes simulating a flow of the fire suppressant into a compartment housing an aircraft auxiliary power unit, and wherein the method further comprises simulating a flow of air in the compartment.

27. The method of claim 25 wherein simulating flow of a fire suppressant from a storage vessel through a conduit to at least one nozzle includes simulating flow of a fire suppressant through a plurality of nozzles, and wherein simulating a flow of the fire suppressant into an aircraft compartment includes simulating a flow of the fire suppressant into a case surrounding an aircraft turbofan engine, and wherein the method further comprises determining concentrations of the fire suppressant at a plurality of locations within the case.

28. A computer-readable medium having instructions for performing a method that includes predicting characteristics of two-phase flow into a volume, the method comprising:
estimating flow properties of a multi-phase flow at a boundary of a volume;
based on the estimate of the flow properties at the volume boundary, at least estimating a value for a quality of the multi-phase flow at the volume boundary;
based on the quality of the flow and the flow properties, at least estimating a value for a liquid phase droplet velocity of a liquid phase of the flow; and
based on the liquid phase droplet velocity, simulating characteristics of the flow into the volume.

29. The computer-readable medium of claim 28 wherein at least estimating a value for a liquid phase droplet velocity includes automatically calculating a multitude of liquid phase droplet velocities at a corresponding multitude of time intervals.

30. The computer-readable medium of claim 28 wherein estimating flow properties includes estimating flow properties as a function of time, and wherein simulating characteristics of the flow includes simulating characteristics of the flow as a function of time.

31. The computer-readable medium of claim 28 wherein at least estimating a value for a liquid phase droplet velocity includes at least estimating a velocity of vapor phase flow at the boundary, and multiplying the velocity of the vapor phase flow by a factor that is less than one and greater than or equal to about 0.8 to obtain the liquid phase droplet velocity.

32. The computer-readable medium of claim 28 wherein simulating characteristics of the flow into the volume includes determining a concentration of at least one constituent of the flow within the volume.

33. The computer-readable medium of claim 28 wherein estimating flow properties of a two-phase flow includes estimating flow properties of a flow of fire suppressant.

34. The computer-readable medium of claim 28 wherein estimating flow properties includes estimating flow properties as a function of time, and wherein estimating a liquid phase droplet velocity includes estimating a liquid phase droplet velocity as a function of time, and further wherein simulating characteristics of the flow into the volume includes determining a concentration of at least one constituent of the flow as a function of time.

35. The computer-readable medium of claim 28 wherein simulating characteristics of the flow into the volume includes simulating characteristics of a flow of fire suppressant into at least one of an auxiliary power unit compartment and a turbofan engine casing.

36. A system for predicting characteristics of two-phase flow into a volume, comprising:
a flow calculator configured to estimate flow properties of a multi-phase flow at a boundary of a volume;
a quality calculator configured to estimate a value for a quality of the multi-phase flow at the volume boundary based on the estimate of flow properties at the volume boundary;
a velocity calculator configured to estimate a value for a liquid phase droplet velocity of a liquid phase of the flow based on the quality of the flow and the flow properties; and
a simulator configured to simulate characteristics of the flow into the volume based on the liquid phase droplet velocity.

37. The system of claim 36 wherein the velocity calculator is configured to multiply a velocity of a vapor phase portion of the flow by a factor that is less than one and greater than or equal to about 0.8 to obtain the liquid phase droplet velocity.

38. The system of claim 36 the simulator is configured to simulate characteristics of a flow of fire suppressant into at least one of an auxiliary power unit compartment and a turbofan engine casing.

39. A system for predicting characteristics of two-phase flow into a volume, comprising:
flow calculator means for estimating flow properties of a multi-phase flow at a boundary of a volume;
quality calculator means for estimating a value for a quality of the multi-phase flow at the volume boundary based on the estimate of flow properties at the volume boundary;
velocity calculator means for estimating a value for a liquid phase droplet velocity of a liquid phase of the flow based on the quality of the flow and the flow properties; and
simulator means for simulating characteristics of the flow into the volume based on the liquid phase droplet velocity.

40. The system of claim 39 wherein the velocity calculator means is configured to multiply a velocity of a vapor phase portion of the flow by a factor that is less than one and greater than or equal to about 0.8 to obtain the liquid phase droplet velocity.

* * * * *